(12) United States Patent
Sugiura et al.

(10) Patent No.: US 8,009,718 B2
(45) Date of Patent: Aug. 30, 2011

(54) WIRELESS TRANSMITTER AND RECEIVER FOR USE IN AN ULTRA-WIDEBAND DIRECT SPREAD PULSE COMMUNICATION SYSTEM

(75) Inventors: Tsuyoshi Sugiura, Yokohama (JP); Takahiro Sato, Yokohama (JP)

(73) Assignee: Samsung Electronics Co., Ltd (KR)

( * ) Notice: Subject to any disclaimer, the term of this patent is extended or adjusted under 35 U.S.C. 154(b) by 1300 days.

(21) Appl. No.: 11/523,432

(22) Filed: Sep. 18, 2006

(65) Prior Publication Data

US 2007/0104258 A1    May 10, 2007

(30) Foreign Application Priority Data

Sep. 16, 2005  (JP) ................................. 2005-270719

(51) Int. Cl.
*H04B 1/00* (2006.01)
*H04L 27/28* (2006.01)

(52) U.S. Cl. ........ 375/130; 375/146; 375/147; 375/152; 375/153; 375/260

(58) Field of Classification Search .................. 375/146, 375/149, 150, 152; 370/347; 455/216
See application file for complete search history.

(56) References Cited

U.S. PATENT DOCUMENTS

| | | | | |
|---|---|---|---|---|
| 7,769,092 | B2 * | 8/2010 | Nagasaka ...................... | 375/260 |
| 2002/0057727 | A1 * | 5/2002 | Li ................................. | 375/146 |
| 2004/0042561 | A1 | 3/2004 | Ho et al. | |
| 2004/0087291 | A1 * | 5/2004 | Wada ............................ | 455/216 |
| 2004/0120388 | A1 * | 6/2004 | Shiba et al. ................... | 375/150 |
| 2005/0281320 | A1 * | 12/2005 | Neugebauer .................. | 375/141 |
| 2008/0019430 | A1 * | 1/2008 | Suzuki et al. ................. | 375/150 |

FOREIGN PATENT DOCUMENTS

| | | |
|---|---|---|
| JP | 2000-59265 | 2/2000 |
| JP | 2000-101547 | 4/2000 |
| JP | 2004-104403 | 2/2004 |
| JP | 2004-241860 | 8/2004 |
| JP | 3564468 | 9/2004 |
| KR | 1020050111410 | 11/2005 |
| KR | 1020060026678 | 3/2006 |

OTHER PUBLICATIONS

Yamamoto Naotake et al., Performance Evaluation of Internally Turbo-Coded Ultra Wideband-Impulse Radio (ITC-UWB-IR) System, 2002.

* cited by examiner

*Primary Examiner* — Chieh M Fan
*Assistant Examiner* — Eboni Hughes
(74) *Attorney, Agent, or Firm* — The Farrell Law Firm, P.C.

(57) ABSTRACT

A wireless transmitter and receiver increase a desired/unwanted (D/U) ratio of a correlation output without increasing the number of data in an ultra-wideband direct spread pulse communication system for transmitting and receiving two series of data through different spreading code streams. In the spreading codes used in matched filters of the wireless transmitter, $(2*N-2)$-th and $(2*N)$-th values of a cross-correlation signal between first and second spreading codes are greater than 0, $(2*N-3)$-th and $(2*N+1)$-th values of an auto-correlation signal of the first spreading code are less than 0, and $(2*N-3)$-th and $(2*N+1)$-th values of an auto-correlation signal of the second spreading code are less than 0. The peak value of the cross-correlation signal does not need to be small, and since a value other than the peak value does not become large, the D/U ratio can increase.

8 Claims, 17 Drawing Sheets

(a) S1-1 AUTO-CORRELATION : REF(PN0) → MATCHED FILTER 8-1 (PN0)
REF                     : -1 -1 -1  1  1 -1  1 -1
MATCHED FILTER 8-1      : -1 -1  0 -1 -1  0 -1  7
CORRELATION SIGNAL      : -1 -1  0 -1 -1  0 -1  7  0 -1  0 -1

(b) S1-2 CROSS-CORRELATION : DATA(PN1[0]) → MATCHED FILTER 8-1 (PN0)
DATA                    : -1 -1 -1  1 -1 -1  1  1
MATCHED FILTER 8-1      : -1 -1  2  3 -1  1 -1 -1
CORRELATION SIGNAL      : -1 -1  1  2  3 -1  0 -3 -1  0 -1  1

(c) S2-1 CROSS-CORRELATION : REF(PN0) → MATCHED FILTER 8-2 (PN1)
REF                     : -1 -1 -1  1  1 -1  1 -1
MATCHED FILTER 8-2      : -1 -1 -2 -3 -1  1 -1 -1
CORRELATION SIGNAL      : -1 -1 -2 -3 -1  0 -3  2 -2  0  2  1

(d) S2-2 AUTO-CORRELATION : DATA(PN1[0]) → MATCHED FILTER 8-2 (PN1)
DATA                    : -1 -1 -1  1 -1 -1  1  1
MATCHED FILTER 8-2      : -1 -1  0 -1 -1  0 -1  7
CORRELATION SIGNAL      : -1 -1  0 -1 -1  0 -1  7  0 -1  0 -1

FIG.2

(a) P0[+T] = P1(REF (PN0)) + P2 (DATA (PN1[+T])) :
    0  1 −1 −1 −1  1 −1  1  1 −1 −1 −1 −1  1

(b) P0[−T] = P1(REF (PN0)) + P3 (DATA (PN1[−T])) :
    −1  1 −1 −1 −1 −1  1  1  1 −1 −1 −1  1 −1  0

(c) S1-3 :    P0[+T] → MATCHED FILTER (PN0) :
    0 −1  1  0  2 −1  3  0  0 −1 −3  0 −2  7 −1  0  2 −1 −3  0  0 −1  3  0 −2 −1  1

(d) S2-3 :    P0[+T] → MATCHED FILTER (PN1) :
    0 −1 −1 −2  0  3 −1  0  0 −3 −1  2  0 −1  7 −2  0 −3 −1  2  0  0  3 −1  2  0  1 −1

(e) S1-4 :    P0[−T] → MATCHED FILTER (PN0) :
    1 −1  2  0  3 −1  0  0 −3 −1 −2  0 −1  7  2  0 −1  2  0 −3 −1  0  0  3 −1 −2  0  1 −1  0

(f) S2-4 :    P0[−T] → MATCHED FILTER (PN1) :
    −1  1  0 −2 −1  3  0  0 −1 −3  0  2  7 −1  0 −2 −1 −3  0  0 −1  3  0  2 −1  1  0

FIG.5

(a) S1-1  AUTO-CORRELATION :
REF (PN0') →
REF                    : 1 1 0 0 -1 1 1 0 0 0 1 1 1 -1 -1
                                    MATCHED
                                    FILTER    (PN0')
MATCHED FILTER 8-1     : -1 0 1 0 0 -1 0 0 1 1 0 0 1 0 -1
                                    1 0 0 0 1 1 1 0 -1
CORRELATION SIGNAL     : -1 -1 1 1 1 1 0 0 -1 0 1 0 0 7 0 0 -1 0 1 0 0 1 1 1 -1 -1 -1

(b) S1-2  CROSS-CORRELATION : DATA (PN1'[0]) →
DATA                   : 1 1 0 0 0 0 -1 0 1 0 1 1 1 0 -1
                                    MATCHED
                                    FILTER    (PN0')
MATCHED FILTER 8-1     : -1 0 1 0 0 -1 1 -1 1 0 -1 0 0 1 1 0 0 1 0 -1
CORRELATION SIGNAL     : -1 -1 1 1 1 0 0 -1 0 2 0 -2 2 2 -1 3 -1 1 -1 1 1 1 0 -1 -1 1 1

(c) S2-1  CROSS-CORRELATION :
REF (PN0') →
REF                    : 1 1 0 0 -1 1 1 0 0 0 1 1 1 -1 -1
                                    MATCHED
                                    FILTER    (PN1')
MATCHED FILTER 8-2     : 1 0 -1 -1 -1 0 1 -1 1 -1 -1 0 1 0 0 0 1 0 -1 1
                                    1 0 0 0 1 1 0 -1 1
CORRELATION SIGNAL     : 1 1 -1 -1 -1 0 1 1 1 -1 3 -1 2 2 -2 0 2 0 1 0 1 1 -1 -1

(d) S2-2  AUTO-CORRELATION : DATA (PN1'[0]) →
DATA                   : 1 1 0 0 0 0 -1 0 1 0 1 1 1 0 -1
                                    MATCHED
                                    FILTER    (PN1')
MATCHED FILTER 8-2     : 1 0 -1 0 -1 1 1 0 0 1 1 0 -1 0 1
                                    1 0 0 0 1 1 0 -1 1
CORRELATION SIGNAL     : 1 1 -1 -1 1 1 0 -1 -1 7 -1 -1 1 0 0 1 0 1 -1 -1 1 1

FIG.7

(a)  P0[+T] = P1(REF (PN0')) + P2 (DATA (PN1'[+T]))
     0  1  2  1  0 -1  1  0  2 -1  1  1 -1 -1  1

(b)  P0[-T] = P1(REF (PN0')) + P3 (DATA (PN1'[-T]))
     1  2  1  0  0 -1  2 -1  2  0 -1  1 -1  0

(c)  S1-3 :  P0[+T] →  MATCHED FILTER  8-1(PN0')
     0 -1 -2  0  2  2  0  1  1  2 -1 -2  3 -2  1  0  1  1  2  1  0 -2  0  1

(d)  S2-3 :  P0[+T] →  MATCHED FILTER  8-2(PN1')
     0  1  2  0 -2 -1  2  1  2 -1  1  0  1 -3  1  2  0  2  0  0  2 -2  0  1

(e)  S1-4 :  P0[-T] →  MATCHED FILTER  8-1(PN0')
    -1 -2  0  2  1  2  0  2  1 -2  1  2 -1  1 -2  1  0  0  2  0 -2  0 -1  0

(f)  S2-4 :  P0[-T] →  MATCHED FILTER  8-2(PN1')
     1  2  0 -2  0  0  2  1  1  0  0 -2 10 -2  1  3 -2  0  3  0  2 -1  0 -1  0

WIRELESS TRANSMITTER AND RECEIVER FOR USE IN AN ULTRA-WIDEBAND DIRECT SPREAD PULSE COMMUNICATION SYSTEM

PRIORITY

This application claims priority under 35 U.S.C. §119 to an application entitled "Wireless Transmitter and Receiver for Use in an Ultra-Wideband Direct Spread Pulse Communication System" filed in the Japan Patent Office on Sep. 16, 2005 and assigned Serial No. 2005-270719, the contents of which are incorporated herein by reference.

BACKGROUND OF THE INVENTION

1. Field of the Invention

The present invention generally relates to a wireless transmitter and receiver, and more particularly to a wireless transmitter and receiver using an ultra-wideband direct spread pulse communication system for transmitting and receiving two series of data through different spread pulse streams.

2. Description of the Related Art

An ultra-wideband wireless communication system has been developed as a new type of data communication system in a spread spectrum communication system. The ultra-wideband wireless communication system performs data communication by spreading data to an ultra wide frequency band of several GHz and overlapping the spread data with a pulse without using a carrier wave. An example of the ultra-wideband wireless communication system is disclosed in "Performance Evaluation of Internally Turbo-Coded Ultra Wideband-Impulse Radio (ITU-UWB-IR) System", YAMAMOTO Yoshitake and OTSUKI Tomoaki, Technical Report of IEICE, pp. 25-30, RCS 2002-55 (2002-05). Because data transmitted with each frequency band has only intensity of noise magnitude in the ultra-wideband wireless communication system, wireless devices using the same frequency band interfere with each other and power consumption is low. Systems that utilize this ultra-wideband wireless communication system are disclosed in Japanese Patent No. 3564468 entitled "Ultra Wideband Wireless Transmitter and Receiver, and Ultra-Wideband wireless Communication Method" (hereinafter, referred to as "Patent Literature 1") that corresponds to Japanese Patent Application No. 2002-262680, and U.S. Patent Application Publication No. 2004/0087291 A1 entitled "Ultra-Wideband Transmitted and receiver, and Ultra-Wideband Wireless Communication Method" (hereinafter, referred to as "Patent Literature 2"), which claims priority to Patent Literature 1, and which was published on May 6, 2004.

The ultra-wideband wireless communication system described in Patent Literature 1 will be described with reference to FIG. 12. FIG. 12 illustrates both a structure of a transmitter of FIG. 1 of Patent Literature 1 and a structure of a receiver of FIG. 7. In FIG. 12, a delay time controller 2 based on the data signal to be transmitted generates a monocycle pulse and then outputs signals K1~K3 to matched filters 1-1~1-3. An example of a structure of the matched filters 1-1~1-3 is illustrated in FIG. 13. For example, K1 and K2 are output when digital data "0" is transmitted and K1 and K3 are output when digital data "1" is transmitted.

When the output signal K1 is transmitted from the delay time controller 2, the matched filter 1-1 outputs a reference pulse stream signal P1 for determination of data spread by a spreading code PN0. Further, the matched filter 1-2 receives the output signal K2 and then outputs a data pulse stream signal P2 spread by a spreading code PN1 later than the reference signal by a predetermined time T. Further, the matched filter 1-3 receives the output signal K3 and then outputs a data pulse stream signal P3 spread by the spreading code PN1 earlier than the reference signal by the predetermined time T. Herein, the spreading codes PN0 and PN1 are orthogonal to each other. After these signals are added by an adder 3 and are amplified by a power amplifier (PA) 4, a pulse stream signal P0 is radiated through an antenna 6.

In a receiver, a low noise amplifier (LNA) 7 amplifies a pulse stream signal P0 received through an antenna 5 and then outputs the amplified signal to matched filters 8-1 and 8-2. An example of the matched filters 8-1 and 8-2 is illustrated in FIG. 14. When the matched filter 8-1 mapped to a spreading code PN0 detects a reference signal, it outputs a correlation output signal S1. When the matched filter 8-2 mapped to a spreading code PN1 detects a data signal, it outputs a correlation output signal S2. A delay time measuring section 9 detects which one of the correlation output signals S1 and S2 is first input. Further, a data determining section 10 demodulates a data signal on the basis of a detection result of the delay time measuring section 9. In this case, data becomes "0" when the correlation output signal S2 is input later than the correlation output signal S1, and data becomes "1" when the correlation output signal S2 is input earlier than the correlation output signal S1.

When this technology is used, the ultra-wideband wireless communication system does not require a digital circuit for high-speed bit synchronization. Thus, a low-speed digital circuit with low power consumption can perform ultra-wideband wireless communication and can eliminate the multi-pass effect.

However, when a large amount of data, for example image signals, is transmitted using the above-described ultra-wideband direct spread pulse communication system, a data transmission rate per unit time needs to be high. To increase the transmission rate, an interval between pulse chips of a pulse stream to be transmitted should be narrowed, the number of pulse chips should be reduced, and a time length of a pulse stream P0 to be transmitted should be shortened.

However, when the number of chips is reduced to increase the transmission rate, the cross-correlation between the correlation outputs S1 and S2 of the matched filters 8-1 and 8-2 of the pulse stream P0 in the receiver is sufficiently reduced with respect to a spread pulse stream signal of the other side. Due to this influence, a desired/unwanted (D/U) ratio is degraded. Further, when 1-bit analog-to-digital (A/D) conversion is performed, a dynamic range is lowered and a bit error rate (BER) is degraded.

To clearly explain these problems, there will be described the well-known 7-chip Barker codes (e.g., PN0 of 1011000 and PN1 of 0001101) in which the number of chips is small and the auto-correlation characteristic is good. As illustrated in FIG. 15, in the 7-chip Barker codes, a D/U ratio of the auto-correlation characteristic is a large value of 7:1. However, when the 7-chip Barker codes are applied to the ultra-wideband direct spread pulse communication system as illustrated in FIG. 16, the cross-correlation characteristic between spreading codes PN0 and PN1 is bad and therefore the D/U ratio is reduced to a ratio up to 7:3 as illustrated in FIGS. 17 and 18. Because the components of FIG. 16 are substantially equal to those of FIG. 12 denoted by the same reference numerals, a repeated description is omitted. To improve the D/U ratio, the cross-correlation characteristic should be improved and a spreading code with an increased number of chips should be used. In this case, it is difficult for a high data transmission rate to be implemented.

SUMMARY OF THE INVENTION

Therefore, the present invention provides a wireless transmitter and receiver using spreading codes with a high desired/unwanted (D/U) ratio of a correlation output without increasing the number of chips in an ultra-wideband direct spread pulse communication system for transmitting and receiving two series of data through different spread pulse streams.

In accordance with an aspect of the present invention, there is provided a wireless transmitter for use in an ultra-wideband direct spread pulse communication system, which includes a delay time controller for generating a periodic pulse, outputting the periodic pulse to a first matched filter, outputting the periodic pulse to a second matched filter when data to be transmitted is in a first level of binary logic levels, and outputting the periodic pulse to a third matched filter when the data to be transmitted is in a second level of the binary logic levels; the first matched filter for outputting a reference signal for data determination using a first spreading code with (2*N−1) chips when the periodic pulse is input; the second matched filter for outputting a first data signal earlier than the reference signal by a predetermined time using a second spreading code with (2*N−1) chips when the periodic pulse is input; and the third matched filter for outputting a second data signal later than the reference signal by a predetermined time using the second spreading code when the periodic pulse is input.

In accordance with another aspect of the present invention, there is provided a wireless receiver for use in an ultra-wideband direct spread pulse communication system, which includes an antenna section for receiving an electronic wave signal and outputting the electronic wave signal to a first matched filter and a second matched filter; the first matched filter for receiving the electronic wave signal from the antenna section and outputting a first output signal using a first spreading code with (2*N−1) chips when a reference signal for data determination is detected; the second matched filter for receiving the electronic wave signal from the antenna section and outputting a second output signal using a second spreading code with (2*N−1) chips when a data signal is detected; a delay time measuring section for detecting which one of the first and second output signals from the first and second matched filters is first output and outputting a detection result; and a data determining section for receiving the detection result and determining whether the data signal is in a first or second level of binary logic levels.

In accordance with yet another aspect of the present invention, there is provided a computer in which a program functions as a wireless transmitter or receiver and a computer readable recording medium records the program. The program may be described in any program language. Further, the recording medium is a recording medium capable of recording a program such as, for example, a compact disc read-only-memory (CD-ROM), a digital versatile disc read-only-memory (DVD-ROM), a flexible disc, and so on. The recording medium can use a conventional recording medium or any recording medium to be used in the future.

BRIEF DESCRIPTION OF THE DRAWINGS

The above and other features and advantages of the present invention will be more clearly understood from the following detailed description taken in conjunction with the accompanying drawings, in which:

FIG. 2 illustrates the auto-correlation characteristic and the cross-correlation characteristic of 7-chip Barker codes;

FIG. 5 illustrates a process for evaluating the codes of FIG. 2 in an evaluation system for an ultra-wideband direct spread pulse communication system;

FIG. 7 illustrates the auto-correlation characteristic and the cross-correlation characteristic of spreading codes in accordance with the present invention;

FIG. 8 illustrates a process for evaluating the codes of FIG. 7 in an evaluation system for the ultra-wideband direct spread pulse communication system;

DETAILED DESCRIPTION OF THE EXEMPLARY EMBODIMENTS

Figure 12:
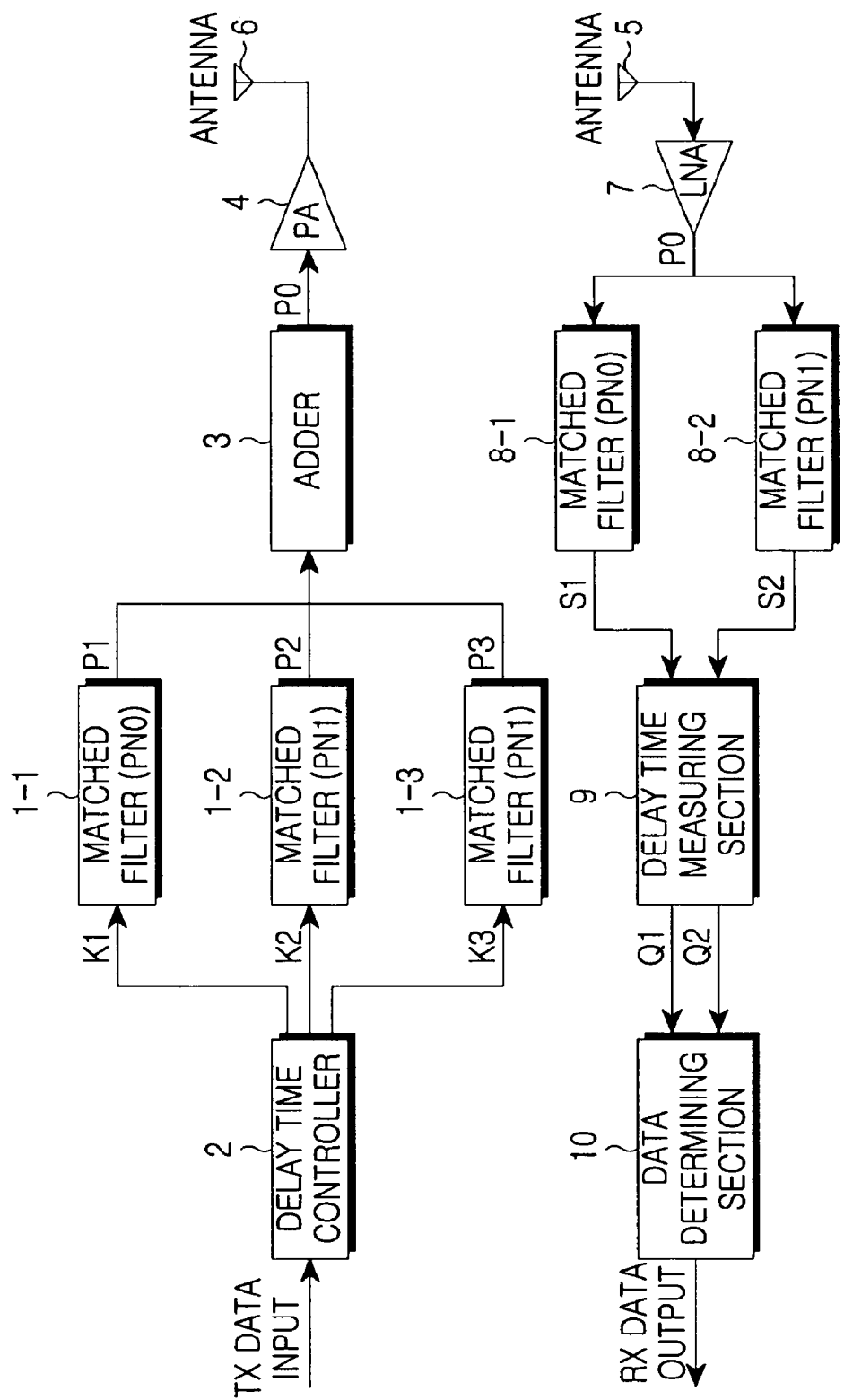
FIG. 12 is a block diagram illustrating an ultra-wideband wireless system.
Figure 13:
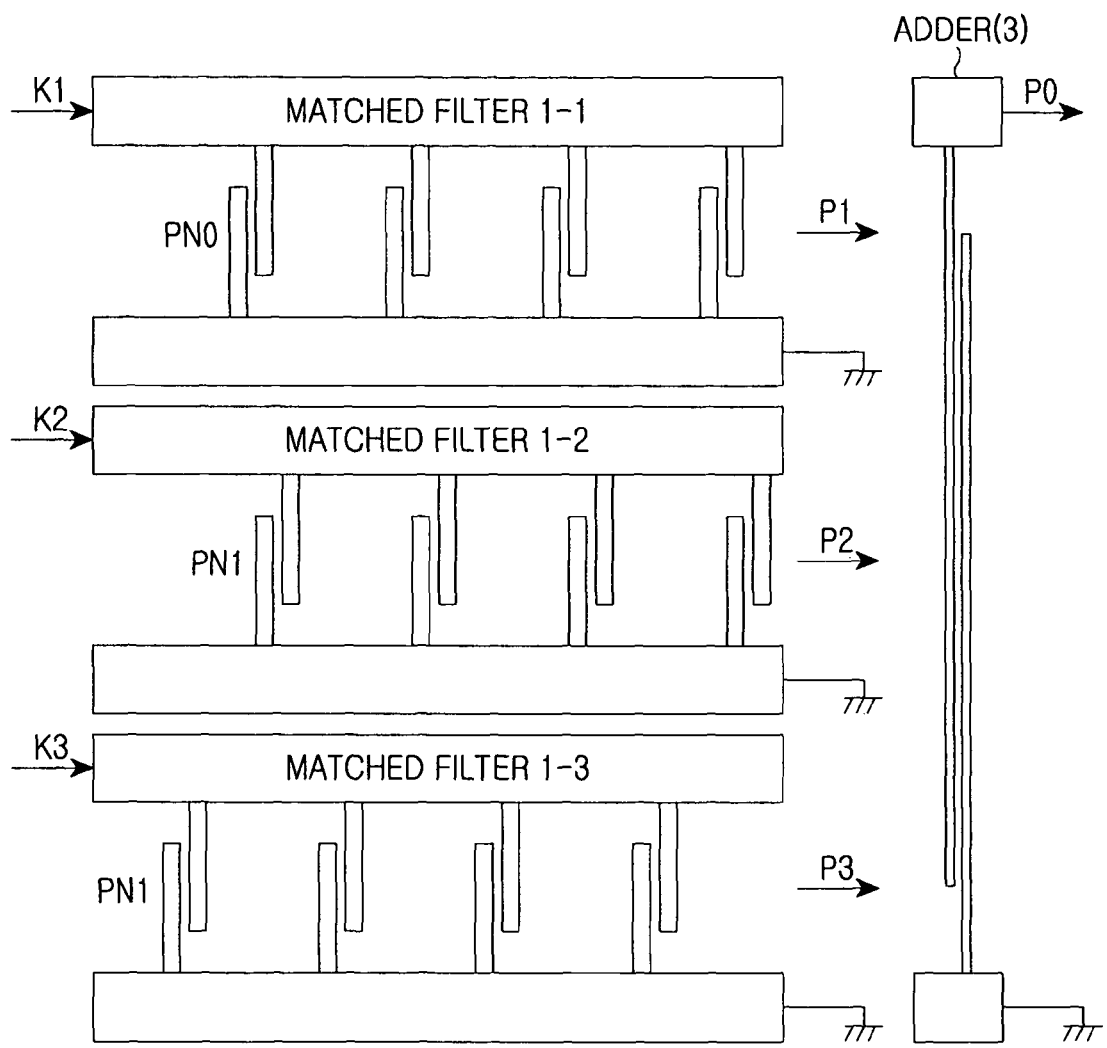
FIG. 13 illustrates matched filters of a transmitter.
Figure 14:
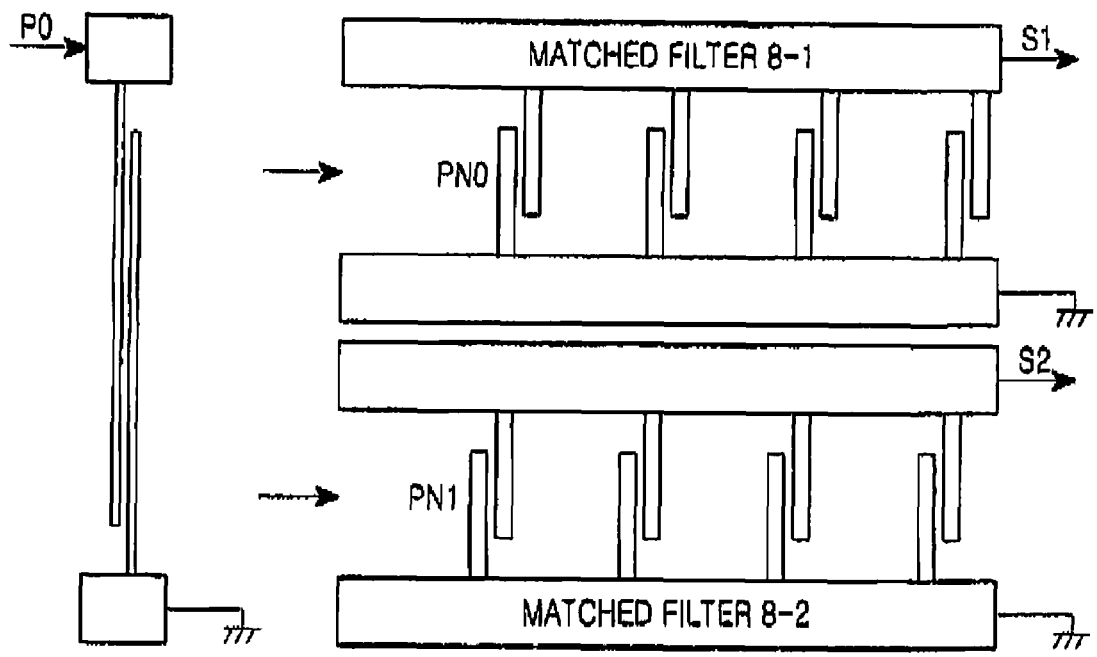
FIG. 14 illustrates matched filters of a receiver.
Figure 15:
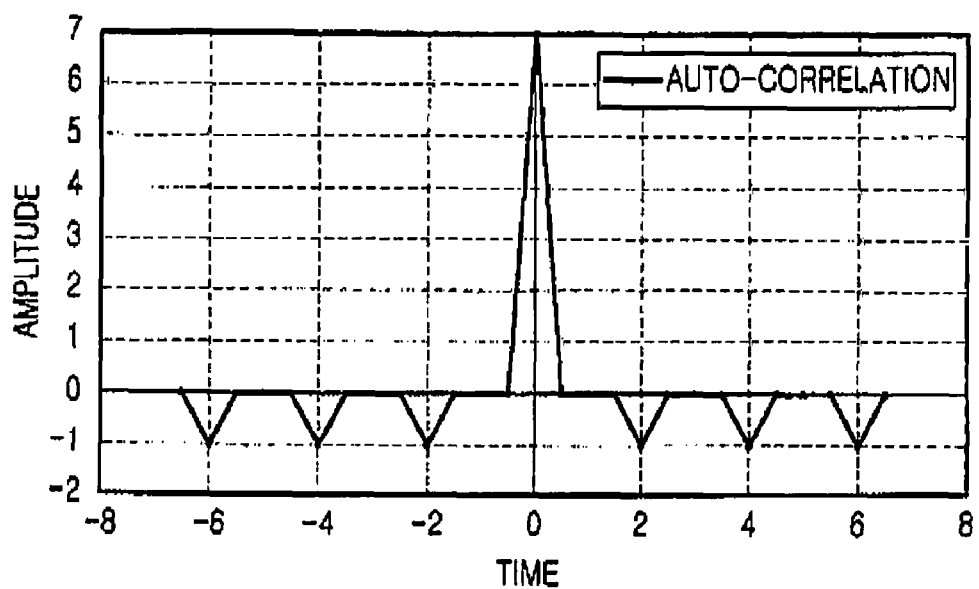
FIG. 15 is a graph illustrating the auto-correlation characteristic.

A wireless transmitter and receiver in accordance with exemplary embodiments of the present invention will be described in detail herein below with reference to the accompanying drawings. In the following description, an overall device structure is the same as that of FIG. 12 or 16 and therefore a repeated description is omitted. Differences from the prior art will be mainly described. In the description and drawings, the same or similar elements are denoted by the same reference numerals and therefore a repeated description is omitted.

Figure 16:
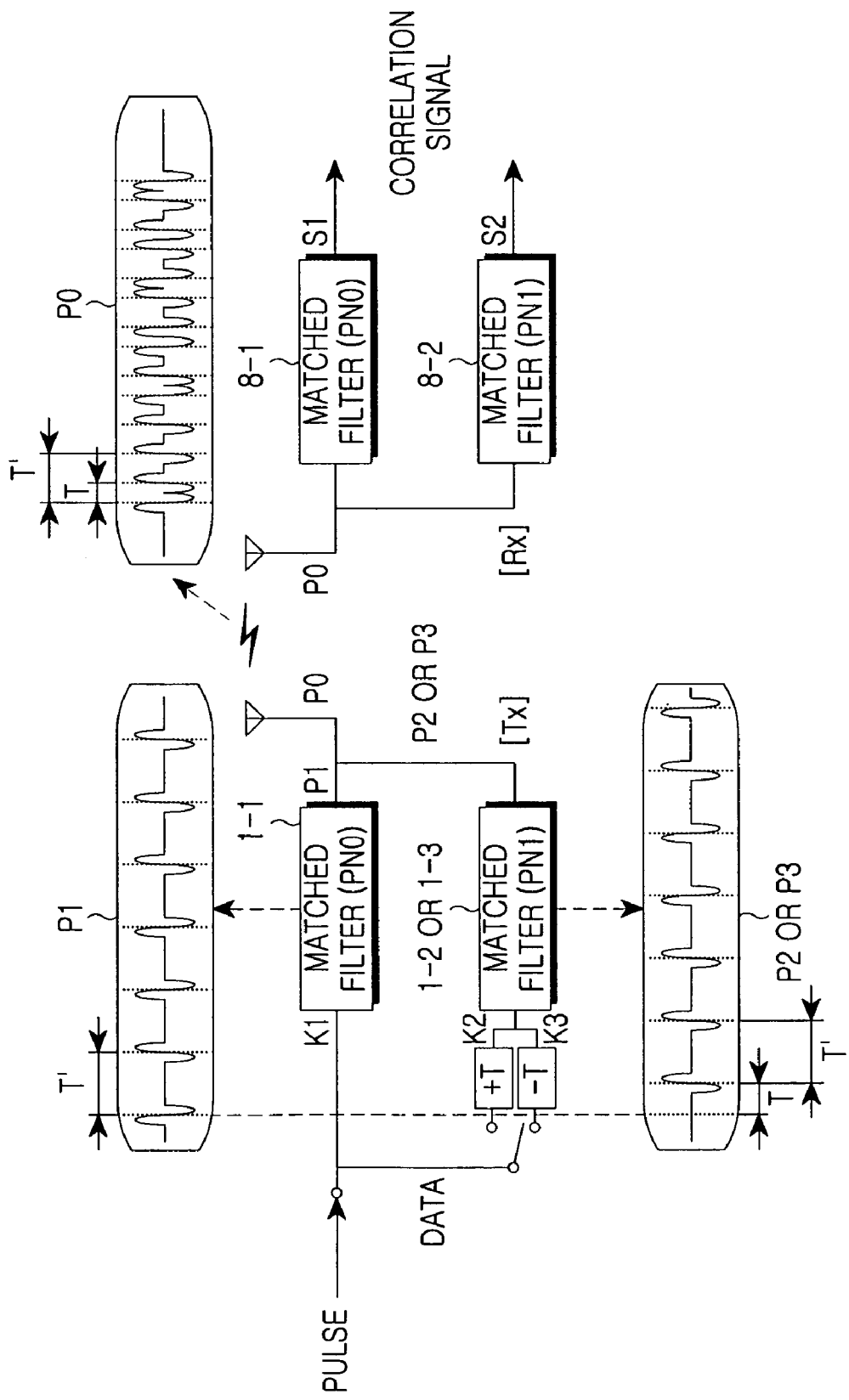
FIG. 16 is a block diagram illustrating the ultra-wideband direct spread pulse communication system.
Figure 17:
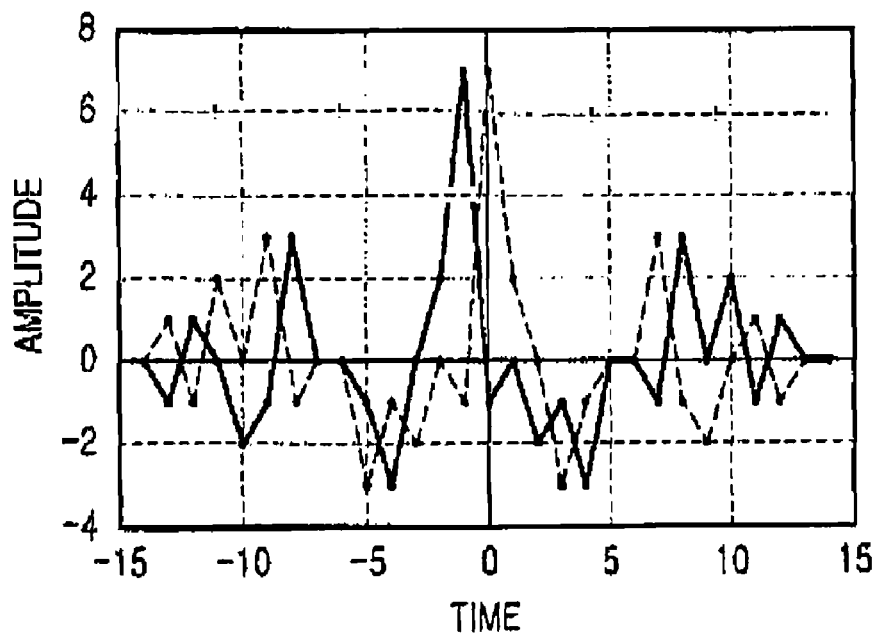
FIG. 17 is a graph illustrating the cross-correlation characteristic.
Figure 18:
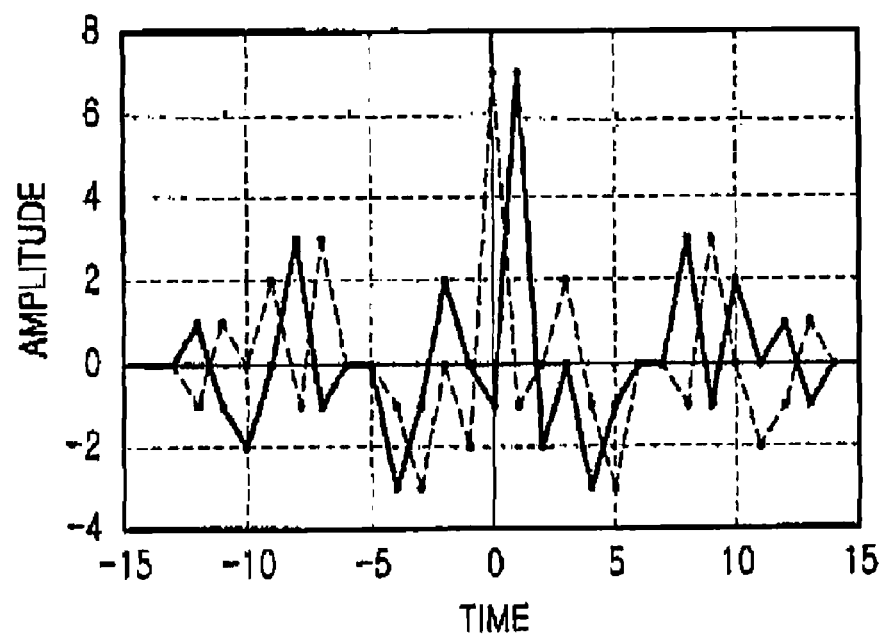
FIG. 18 is a graph illustrating the cross-correlation characteristic.

In the case of spreading codes such as the conventional Barker or Gold codes, a pulse stream signal P1 generated by a spreading code PN0 in a matched filter 1-1, a pulse stream signal P2 generated by a spreading code PN1 in a matched filter 1-2, and a pulse stream signal P3 generated by a spreading code PN2 in a matched filter 1-3 has a chip interval of T', respectively, as illustrated in FIG. 16. A transmission pulse signal P0 is transmitted in which each chip of the pulse stream signal P2 or P3 is arranged between chips of the pulse stream signal P1.

In this case, a correlation signal obtained in the receiver is output so that a correlation signal of P1 and a correlation signal of P2 or P3 are arranged between the chips thereof. The correlation signals do not affect each other. Thus, when the cross-correlation characteristic is below a required level, i.e. is "bad", even though the auto-correlation characteristic is above a required level, i.e. "good", a side lobe of a finally obtained correlation signal is set in a cross-correlation signal level, such that a desired/unwanted (D/U) ratio of the cross-correlation characteristic is less than that of the auto-correlation characteristic. When the number of chips is large, a code with a good cross-correlation characteristic can be provided. However, when the number of chips is limited, a communication quality may be degraded.

Figure 1A:
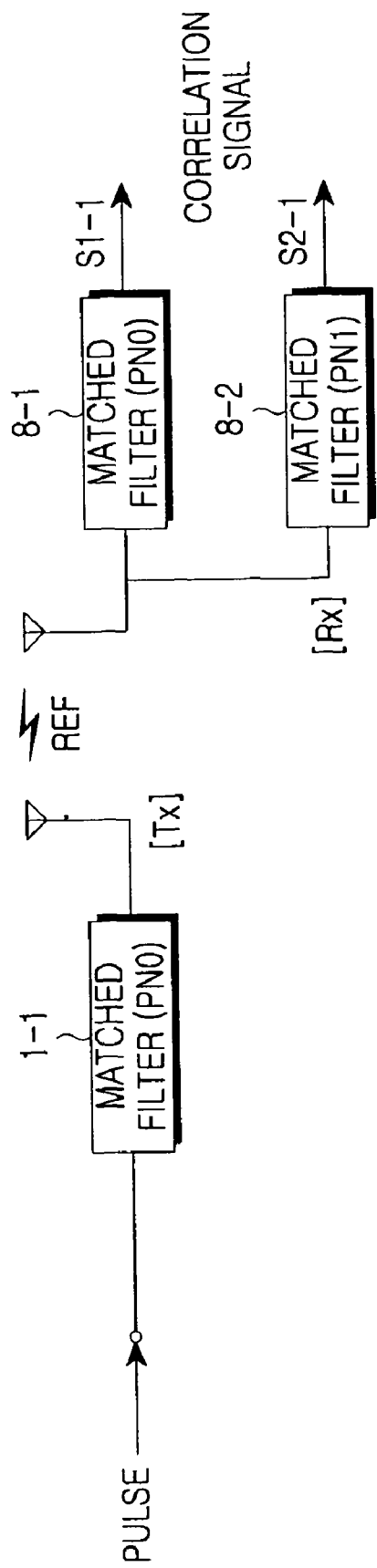
FIGS. 1A and 1B are block diagrams illustrating test systems for evaluating auto-correlation characteristic and cross-correlation characteristic.
Figure 1B:
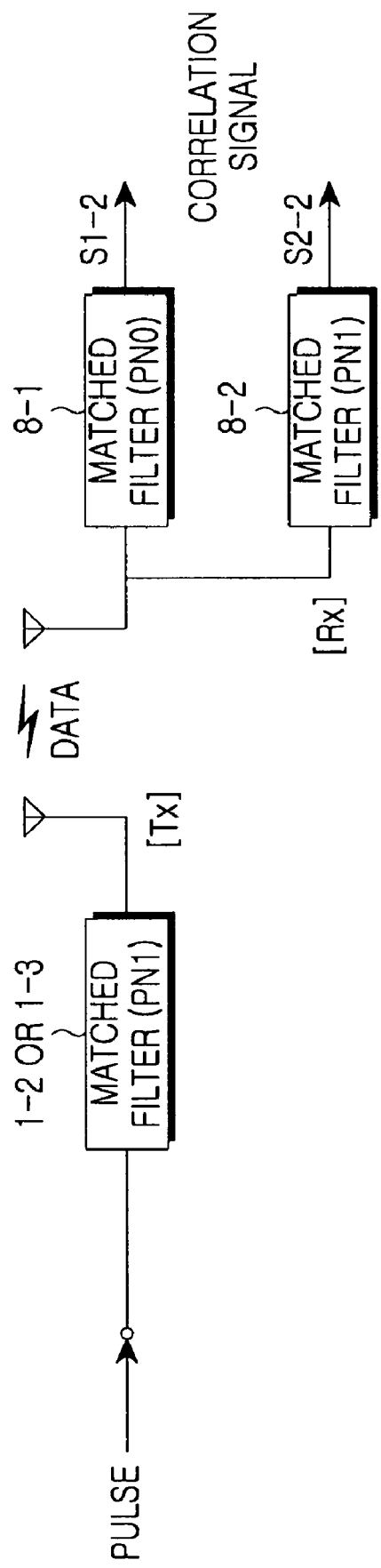

FIGS. 1A and 1B are block diagrams illustrating test systems for evaluating the auto-correlation characteristic and the cross-correlation characteristic. In FIG. 1A, a matched filter 1-1 of a transmitter is mapped to a spreading code PN0. In FIG. 1B, a matched filter 1-2 or 1-3 of the transmitter is mapped to a spreading code PN1.

FIG. 2 illustrates the auto-correlation characteristic and the cross-correlation characteristic when 7-chip Barker codes (e.g., PN0 of 101100 and PN1 of 0001101) are evaluated in the test system of FIGS. 1A and 1B. Diagram (a) of FIG. 2 illustrates an auto-correlation signal S1-1 of the spreading code PN0 in a matched filter 8-1. Diagram (b) of FIG. 2 illustrates a cross-correlation signal S1-2 of the spreading codes PN0 and PN1 in the matched filter 8-1. Diagram (c) of FIG. 2 illustrates a cross-correlation signal S2-1 of the spreading codes PN0 and PN1 in a matched filter 8-2. Diagram (d) of FIG. 2 illustrates an auto-correlation signal S2-2 of the spreading code PN1 in the matched filter 8-2. As illustrated in FIG. 2, the auto-correlation characteristic in which the D/U ratio is 7:1 is good, but a peak value of the cross-correlation characteristic becomes 3.

Figure 3:
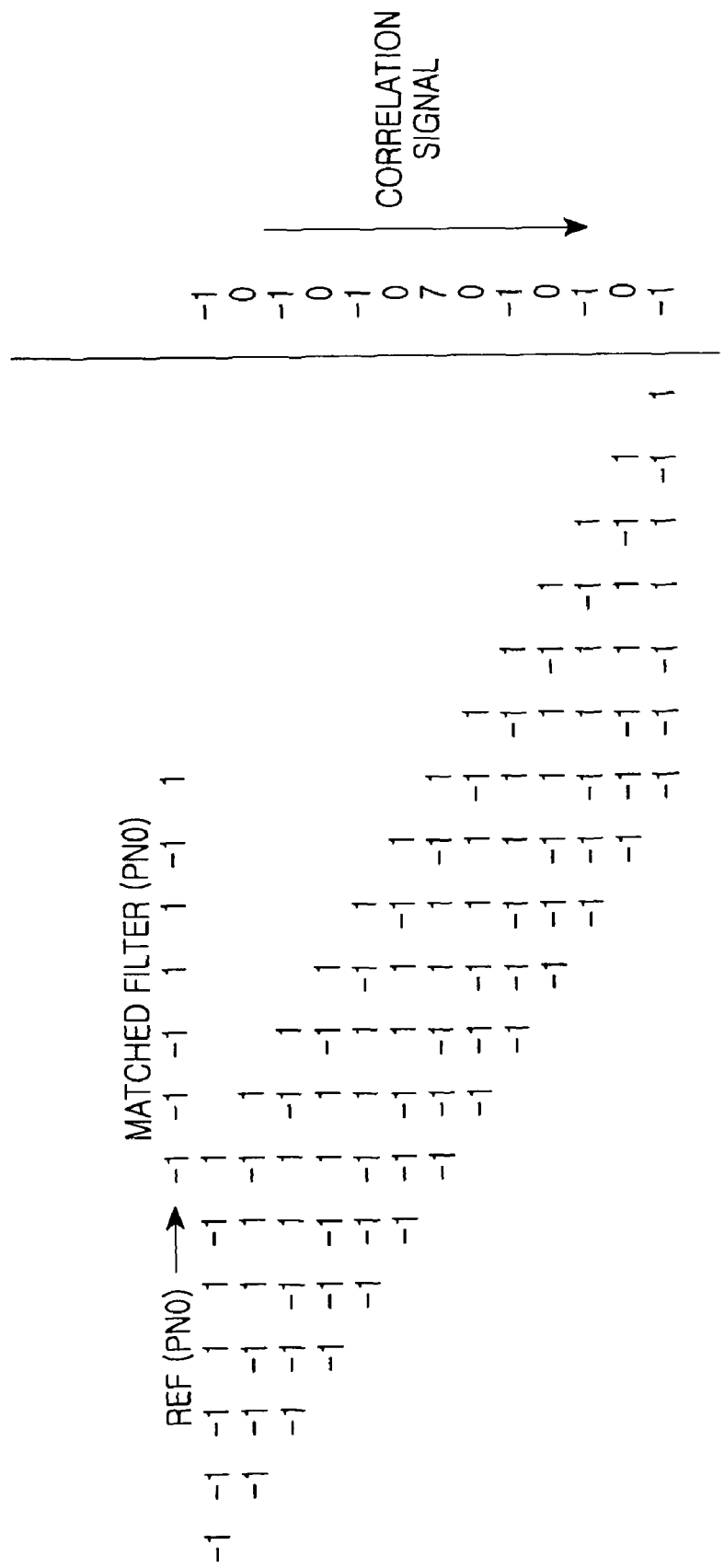
FIG. 3 illustrates a process for computing a correlation signal.

FIG. 3 illustrates a method for computing the correlation signal of FIG. 2. For example, FIG. 3 will be described with reference to the case of diagram (a) of FIG. 2. When one chip of REF(PN0) is input to a matched filter (PN0) on Line 1 of FIG. 3, a correlation value is $1*(-1)=-1$. When two chips of REF(PN0) are input to the matched filter (PN0) on Line 2 of FIG. 3, a correlation value is $1*(-1)+(-1)*(-1)=0$. Similarly, when seven chips of REF(PN0) are input to the matched filter (PN0) on Line 7 of FIG. 3, a correlation value is $(-1)*(-1)+(-1)*(-1)+(-1)*(-1)+1*1+1*1+(-1)*(-1)+1*1=7$. Thus, a correlation signal of "−1, 0, −1, 0, −1, 0, 7, 0, −1, 0, −1, 0, −1" is computed. In the following description, the correlation signal computation is the same as the method of FIG. 3 and therefore a detailed description is omitted.

Figure 4A:
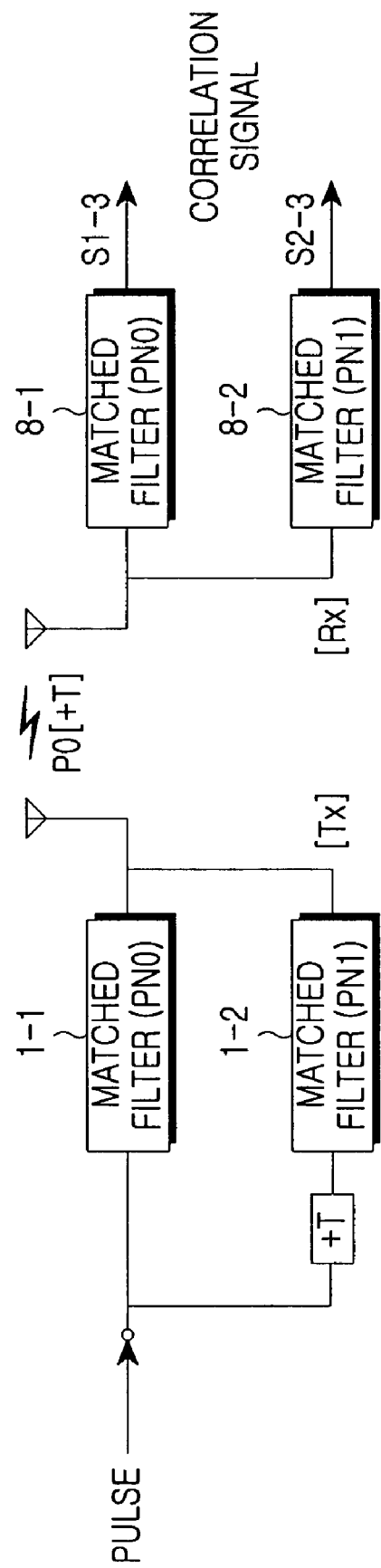
FIGS. 4A and 4B are block diagrams illustrating test systems for evaluating the auto-correlation characteristic and the cross-correlation characteristic.
Figure 4B:
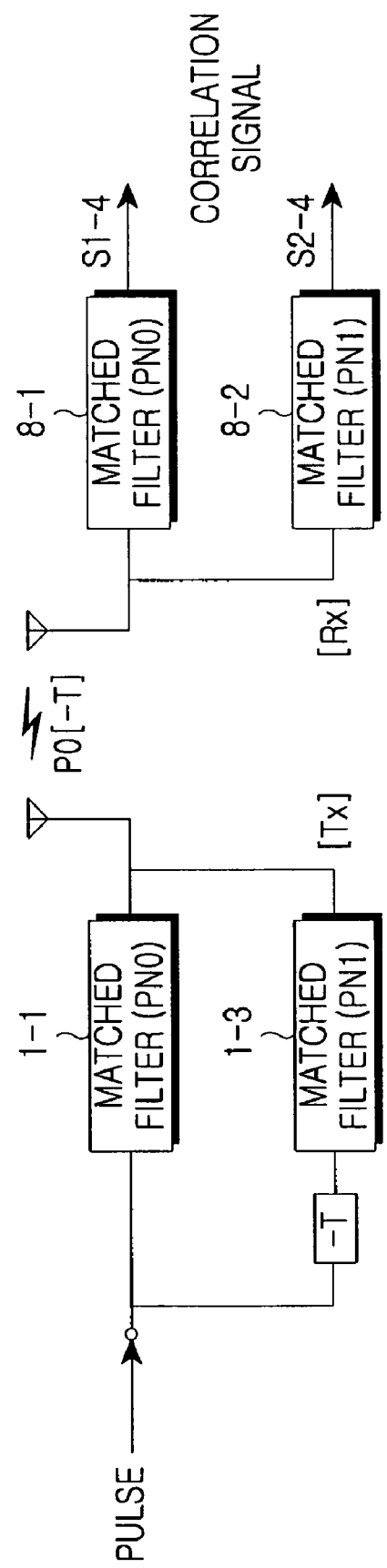

FIGS. 4A and 4B are block diagrams illustrating systems for evaluating the auto-correlation characteristic and the cross-correlation characteristic for an ultra-wideband direct spread pulse communication system. In FIG. 4A, a matched filter 1-2 of a transmitter is mapped to a delay time [+T]. In FIG. 4B, a matched filter 1-3 of the transmitter is mapped to a delay time [−T].

FIG. 5 illustrates the auto-correlation characteristic and the cross-correlation characteristic when the 7-chip Barker codes are evaluated in the evaluation system for the ultra-wideband direct spread pulse communication system as illustrated in FIGS. 4A and 4B. Diagram (a) of FIG. 5 illustrates a transmission pulse stream signal P0[+T] of a delay time [+T]. Diagram (b) of FIG. 5 illustrates a transmission pulse stream signal P0[−T] of a delay time [−T]. Diagram (c) of FIG. 5 illustrates a correlation signal S1-3 between the transmission pulse stream signal P0[+T] and a matched filter 8-1 of a spreading code PN0. Diagram (d) of FIG. 5 illustrates a correlation signal S2-3 between the transmission pulse stream signal P0[+T] and a matched filter 8-2 of a spreading code PN1. Diagram (e) of FIG. 5 illustrates a correlation signal S1-4 between the transmission pulse stream signal P0[−T] and the matched filter 8-1 of the spreading code PN0. Diagram (f) of FIG. 5 illustrates a correlation signal S2-4 between the transmission pulse stream signal P0[−T] and the matched filter 8-2 of the spreading code PN1.

In FIG. 5, underlined values indicate signals generated from a reference pulse stream signal P1 (REF). The other values are mapped to a data pulse stream signal P2 or P3. In a final correlation signal, the cross-correlation pulse chip is independently inserted between auto-correlation pulse chips. When the cross-correlation characteristic is bad, a D/U ratio of the correlation signal is reduced.

Figure 6:
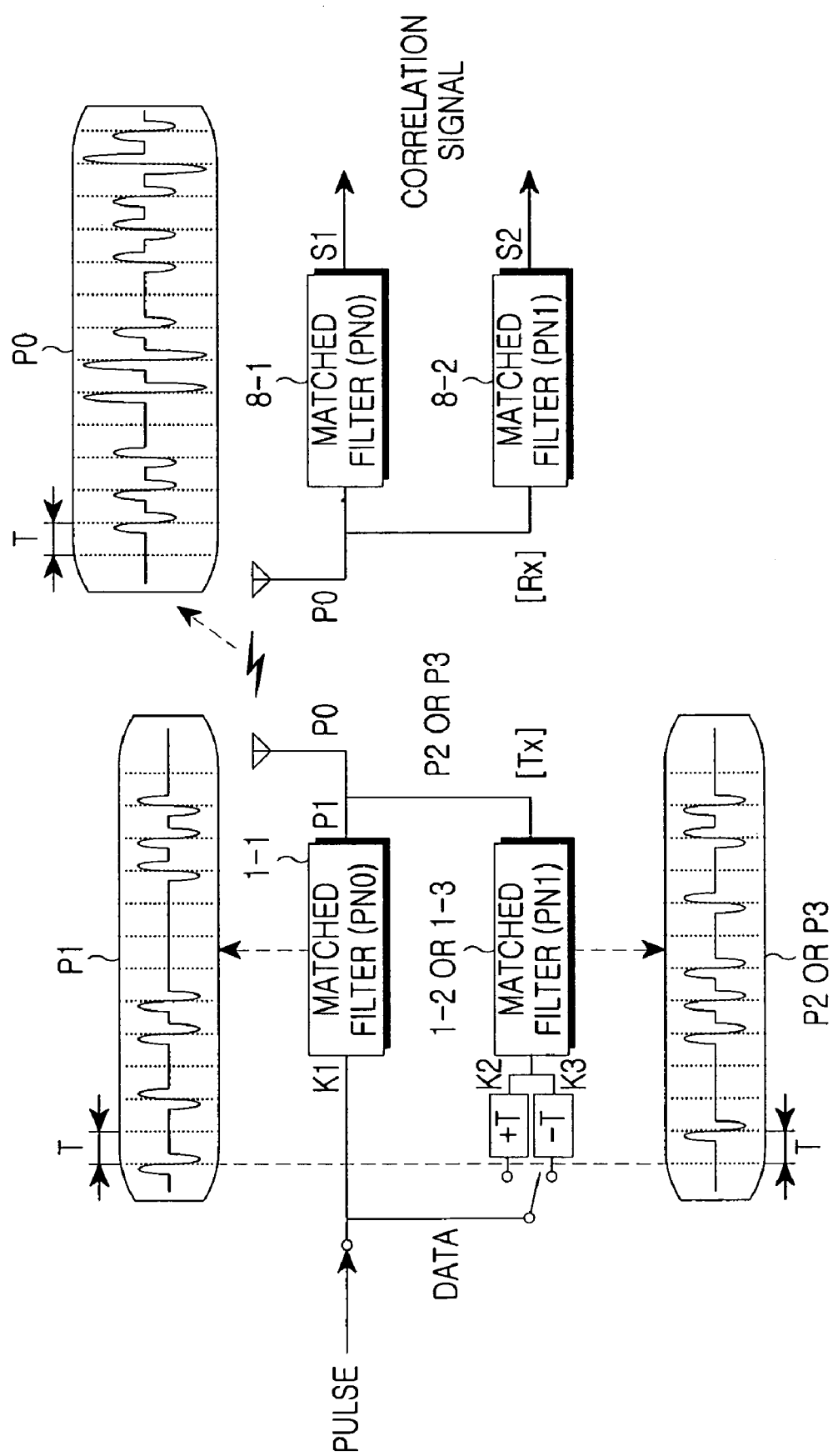
FIG. 6 illustrates amplitude modulation of a transmission pulse signal stream.

In this embodiment, chips of the transmission pulse stream signal P0 are arranged at a chip interval T in the same period where T'=2*T in the ultra-wideband direct spread pulse communication system as illustrated in FIG. 6. Thus, a delay time for data determination T is equal to the chip interval. Pulse stream signals P1~P3 in which a chip interval is T'=2T and the number of chips is N in the conventional system are extended to pulse stream signals in which a chip interval is T and the number of chips is (2*N−1). Because an added transmission pulse stream signal P0 has the same number of chips, a data transmission rate is not degraded. Further, a code value of each chip is selected from three values of −1, 0, and 1. As a result, because chips of the reference pulse stream signal P1 and the data pulse stream signal P2 or P3 are not arranged in the same period, the added transmission pulse stream signal P0 has five values of −2, −1, 0, 1, and 2 and are amplitude-modulated.

Because chips of the correlation signal of P1 and the correlation signal of P2 or P3 are not arranged in the same period in the receiver, the correlation signals are not generated in independent positions. Thus, the correlation signals affect each other. Using this effect, this exemplary embodiment is accomplished.

In this embodiment, (2*N−2)-th and (2*N)-th values of an output cross-correlation signal of two spreading codes PN0' and PN1' with (2*N−1) chips are more than 2. Further, (2*N−3)-th and (2*N+1)-th values of the auto-correlation signal of the spreading code PN0' are less than 0, and (2*N−3)-th and (2*N+1)-th values of the auto-correlation signal of the spreading code PN1' are less than 0.

With respect to a reference pulse stream signal P1' for determination of data spread by the spreading code PN0' in the matched filter 1-1, chips of the data pulse stream signal P2' or P3' spread by the spreading code PN1' in the matched filter 1-2 or 1-3 are spaced by ±T. When a peak value of a (2*N−1)-th value of the auto-correlation signal is added to a (2*N−2)-th or (2*N)-th value of the cross-correlation signal (more than 2), a peak value of a correlation signal increases.

Further, the (2*N−2)-th or (2*N)-th value of the cross-correlation signal of one side, which is not added to the (2*N−2)-th value of the auto-correlation signal, is added to (2*N−3)-th and (2*N+1)-th values of the auto-correlation signal. However, because this value is less than 0, the associated value becomes small. When the spreading codes PN0' and PN1' are used as described above, the peak value of the correlation signal can be increased without degrading a side lobe value of the correlation signal. Thus, the D/U ratio can be increased and the data transmission rate can be increased while maintaining the communication quality.

A spreading code of a transmission and reception system of this embodiment will be described, for example, when N=7. FIG. 7 illustrates the auto-correlation characteristic and the cross-correlation characteristic when the evaluation process is performed in the test system of FIGS. 1A and 1B. Diagram (a) of FIG. 7 illustrates an auto-correlation signal S1-1 of a spreading code PN0' in a matched filter 8-1. Diagram (b) of FIG. 7 illustrates a cross-correlation signal S1-2 of spreading codes PN0' and PN1' in the matched filter 8-1. Diagram (c) of FIG. 7 illustrates a cross-correlation signal S2-1 of the spreading codes PN0' and PN1' in a matched filter 8-2. Diagram (d) of FIG. 7 illustrates an auto-correlation signal S2-2 of the spreading code PN0' and PN1' in the matched filter 8-2.

FIG. 8 illustrates an evaluation result in the evaluation system for the ultra-wideband direct spread pulse communication system as illustrated in FIGS. 4A and 4B. Diagram (a) of FIG. 8 illustrates a transmission pulse stream signal P0[+T] of a delay time [+T]. Diagram (b) of FIG. 8 illustrates a transmission pulse stream signal P0[−T] of a delay time [−T]. Diagram (c) of FIG. 8 illustrates a correlation signal S1-3 between the transmission pulse stream signal P0[+T] and a matched filter 8-1 of a spreading code PN0'. Diagram (d) of FIG. 8 illustrates a correlation signal S2-3 between the transmission pulse stream signal P0[+T] and a matched filter 8-2 of a spreading code PN1'. Diagram (e) of FIG. 8 illustrates a correlation signal S1-4 between the transmission pulse stream signal P0[−T] and the matched filter 8-1 of the spreading code PN0'. Diagram (f) of FIG. 8 illustrates a correlation signal S2-4 between the transmission pulse stream signal P0[−T] and the matched filter 8-2 of the spreading code PN1'.

In FIGS. 7 and 8, values inserted into a box "□" relate to a combination of peak value parts of a final correlation output signal. In the present invention, the matched filters output correlation output signals of four combinations such as a correlation output signal between an auto-correlation signal S1-1 and a cross-correlation signal S1-2, a correlation output signal between the auto-correlation signal S1-1 and a cross-correlation signal S2-1, a correlation output signal between an auto-correlation signal S2-2 and the cross-correlation signal S1-2, and a correlation output signal between the auto-correlation signal S2-2 and the cross-correlation signal S2-1. As a result, an output peak value 9 (or 10) is a sum of 7 and 2 (or 7 and 3) corresponding to an auto-correlation value and a cross-correlation value.

As illustrated in FIG. 8, the D/U ratio is 9:2 in the case of P0[+T]. In this system, a side lobe signal in a slow time range is negligible. In the case of P0[−T], the D/U ratio is a good value of 10:2. The spreading codes used in the present invention can lead to the significant improvement, in comparison with the conventional spreading codes.

Spreading codes with the auto-correlation characteristic capable of satisfying the above-described conditions are computed with respect to a designated N value at a required data transmission rate. Two spreading codes are selected from the computed spreading codes and a combination capable of satisfying the cross-correlation characteristic is extracted.

Figures 9, 10:
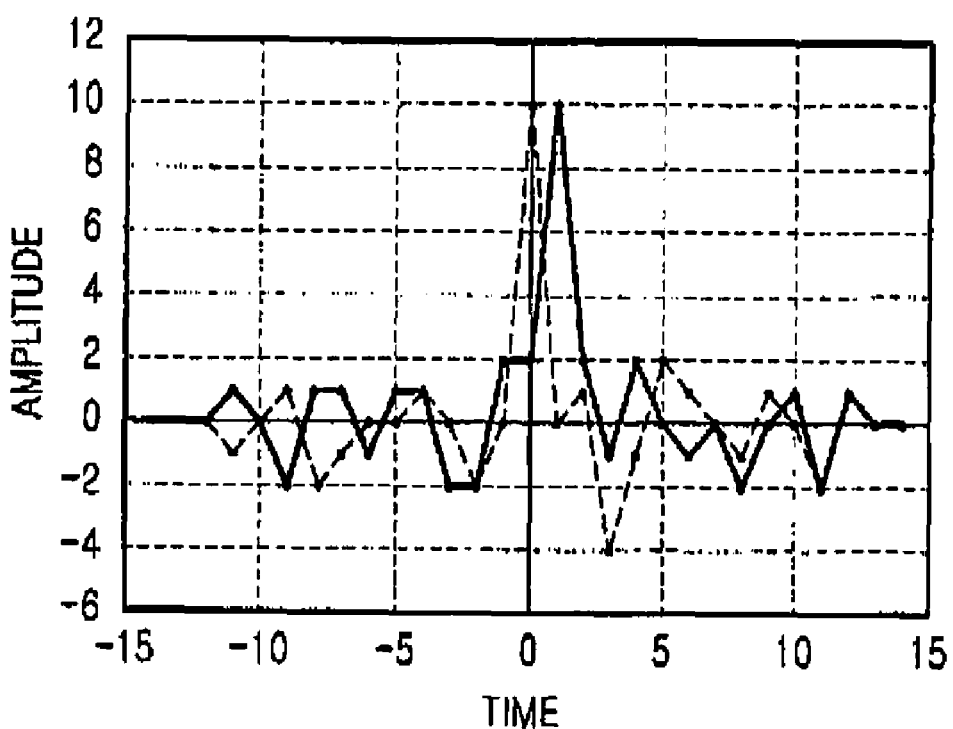
FIG. 9 illustrates spreading codes in accordance with the present invention.
FIG. 10 illustrates a graph for evaluating the codes of FIG. 9 in an evaluation system for the ultra-wideband direct spread pulse communication system.

FIG. 9 illustrates an example of other spreading codes. Diagram (a) of FIG. 9 illustrates spreading codes PN0(TX) and PN1(TX) applied to a matched filter of a transmitter. Diagram (b) of FIG. 9 illustrates spreading codes PN0(RX) and PN1(RX) applied to a matched filter of a receiver. Further, a code obtained by reversing the spreading code of FIG. 9 can be used. For example, when PN0(TX)="0, 1, 0, −1, 0, 1, 1, 0, 0, 0, −1, 1, −1,", its reversed code of "−1, 1, −1, 0, 0, 0, 1, 1, 0, −1, 0, 1, 0" can be used. Further, the reversed code corresponds to PN0(RX).

Figure 11:
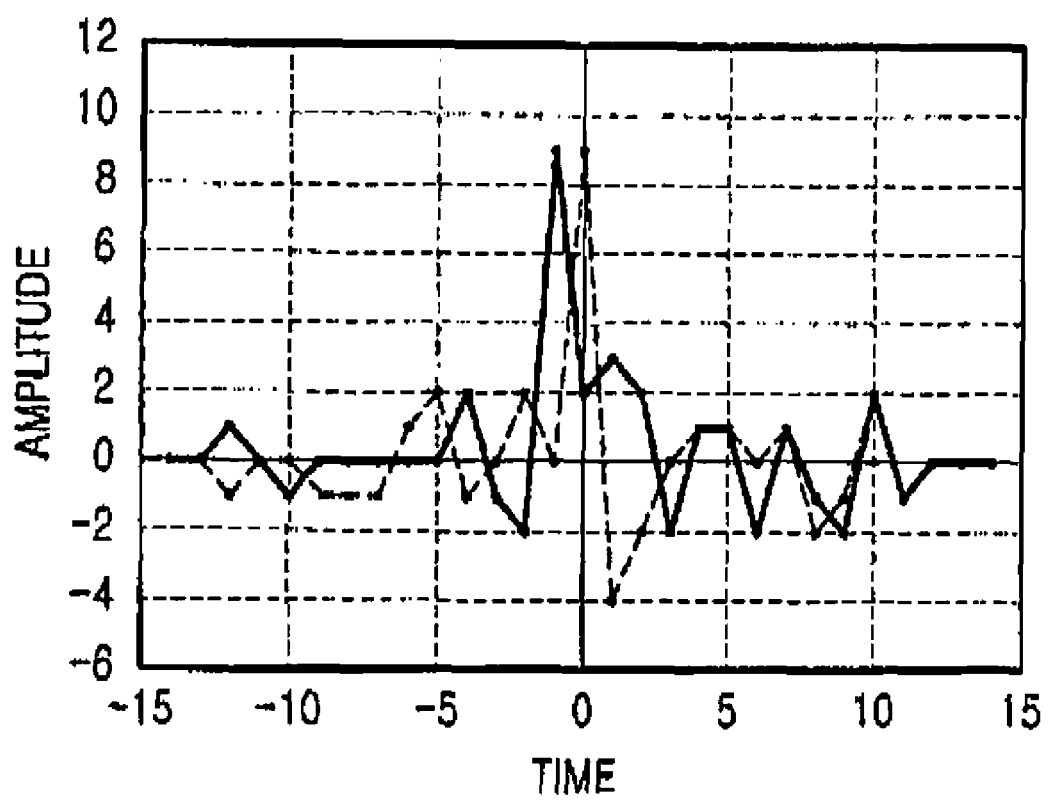
FIG. 11 illustrates a graph for evaluating the codes of FIG. 9 in an evaluation system for the ultra-wideband direct spread pulse communication system.

FIGS. 10 and 11 illustrate results obtained by evaluating the spreading codes of FIG. 9 in the evaluation system for the ultra-wideband direct spread pulse communication system as illustrated in FIGS. 4A and 4B. As illustrated in FIG. 10, the D/U ratio in the case of P0[+T] is 10:2. In this system, a side lobe signal in a slow time range is negligible. As illustrated in FIG. 11, the D/U ratio in the case of P0[−T] is a good value of 9:2. The spreading codes of FIG. 9 can lead to the significant improvement, in comparison with the conventional spreading codes.

As described above, the present invention can obtain a high D/U ratio of a correlation output without increasing the number of chips in the ultra-wideband direct spread pulse communication system for transmitting and receiving two series of data using different spread pulse streams.

For example, the case where (2*N−2)-th and (2*N)-th values of the cross-correlation signal between the first spreading code PN0' and the second spreading code PN1' are more than 0 has been described. Alternatively, (2*N−3)-th and (2*N+1)-th values may be set to more than 0 or (2*N−4)-th and (2*N+2)-th values may be set to more than 0. That is, arbitrary values in left and right symmetrical positions spaced by ±T can be set to more than 0. Thus, data can be further multiplexed using a difference of a delay time T.

A structure in which the transmitter is provided with only two matched filters 1-2 and 1-3 for assigning a delay time in the above-described exemplary embodiment has been described. Alternatively, the transmitter may be provided with at least three matched filters. In this case, the spreading codes can be appropriately optimized according to the number of matched filters and a delay time.

In the above-described embodiment, the case where the (2*N−2)-th and (2*N)-th values of the output cross-correlation signal of the two spreading codes PN0' and PN1' with the (2*N−1) chips are more than 2 has been described. However, the present invention is not so limited. If the values are more than 0, the D/U ratio does not become small. Further, because the D/U ratio can increase if the values are more than 1, it is valid.

In relation to the two spreading codes PN0' and PN1' with the (2*N−1) chips in the above-described embodiment, the case where the (2*N−3)-th and (2*N+1)-th values of the auto-correlation signal of the spreading code PN0' are less than 0, and the (2*N−3)-th and (2*N+1)-th values of the auto-correlation signal of the spreading code PN1' are less than 0 has been described. However, the present invention is not so limited. Because the D/U ratio can increase if the values are less than −1, it is valid. Further, if the values are less than −2, the utility further increases.

When computer programs for realizing the above-described functions are combined in a computer, the computer can function as the wireless transmitter or receiver described in the exemplary embodiments. These computer programs can be distributed to the markets in a predetermined recording medium form (e.g., a compact disc read-only-memory (CD-ROM)) or a download form through an electronic network.

The wireless transmitter and receiver can provide spreading codes in which a desired/unwanted (D/U) ratio of a correlation output is high in the ultra-wideband direct spread pulse communication system for transmitting and receiving two series of data through different spreading code streams.

That is, when an evaluation system for use in the ultra-wideband direct spread pulse communication system performs an evaluation process in the case where the (2*N−2)-th and (2*N)-th values of the cross-correlation signal between the first and second spreading codes used in the present invention are more than 0, a (2*N−1)-th value of the cross-correlation signal (corresponding to a D value of the D/U ratio or a peak value) does not become small.

When the evaluation system for use in the ultra-wideband direct spread pulse communication system performs an evaluation process in the case where the (2*N−3)-th and (2*N+1)-th values of the auto-correlation signals of the first and second spreading codes are less than 0, (2*N−3)-th and (2*N+1)-th values of the cross-correlation signal (corresponding to a U value of the D/U ratio) do not become large.

When the (2*N−2)-th and (2*N)-th values of the cross-correlation signal (corresponding to the D value of the D/U ratio) are more than 0, the D/U ratio does not become small. In particular, because the D/U ratio can increase when the values are more than 1, it is valid. Further, when the values are more than 2, the utility further increases. Similarly, when the (2*N−3)-th and (2*N+1)-th values of the auto-correlation signals of the first and second spreading codes (corresponding to the U value of the D/U ratio) are less than 0, the D/U ratio does not become small. In particular, because the D/U ratio can increase when the values are less than −1, it is valid. Further, when the values are less than −2, the utility further increases.

Various applications are possible in the wireless transmitter and receiver of the present invention. For example, the first to third matched filters in the transmitter, and the first and second matched filters in the receiver can be implemented with surface acoustic wave (SAW) filters. When the matched filters are configured with the SAW filters, a signal can be processed without using a complex digital circuit and therefore the power consumption is reduced.

The spreading codes of the present invention are more effective when N is less than 15 (or the number of chips is less than 29 (=2*N−1=2*15−1) in which the good cross-correlation characteristic may not be obtained.

In an example of the spreading codes of the present invention in the transmitter, the first spreading code is "1, 1, 0, 0, −1, 1, 0, 1, 0, 0, 1, 0, −1" or "−1, 0, 1, 0, 0, 1, 0, 1, −1, 0, 0, 1, 1" corresponding to a reversed code thereof and the second spreading code is "1, 1, 0, 0, 0, 0, 1, −1, 1, 0, −1, 0, 1" or "1, 0, −1, 0, 1, −1, 1, 0, 0, 0, 1, 1" corresponding to a reversed code thereof. According to these spreading codes, the D/U ratio is set to a good value of 9:2 or 10:2.

In an example of the spreading codes of the present invention in the receiver, the first spreading code is "−1, 0, 1, 0, 0, 1, 0, 1, −1, 0, 0, 1, 1" or "1, 1, 0, 0, −1, 1, 0, 1, 0, 0, 1, 0, −1" corresponding to a reversed code thereof and the second spreading code is "1, 0, −1, 0, 1, −1, 1, 0, 0, 0, 0, 1, 1" or "1, 1, 0, 0, 0, 0, 1, −1, 1, 0, −1, 0, 1" corresponding to a reversed code thereof. According to these spreading codes, the D/U ratio is set to a good value of 9:2 or 10:2.

In another example of the spreading codes of the present invention in the transmitter, the first spreading code is "0, 1, 0, −1, 0, 1, 1, 0, 0, 0, −1, 1, −1" or "−1, 1, −1, 0, 0, 0, 1, 1, 0, −1, 0, 1, 0" corresponding to a reversed code thereof and the second spreading code is "0, 1, 0, 0, 1, 1, 1, 0, −1, 0, 0, −1, 1" or "1, −1, 0, 0, −1, 0, 1, 1, 1, 0, 0, 1, 0" corresponding to a reversed code thereof. According to these spreading codes, the D/U ratio is set to a good value of 9:2 or 10:2.

In another example of the spreading codes of the present invention in the receiver, the first spreading code is "−1, 1, −1, 0, 0, 0, 1, 1, 0, −1, 0, 1, 0" or "0, 1, 0, −1, 0, 1, 1, 0, 0, 0, 0, −1, 1, −1" corresponding to a reversed code thereof and the second spreading code is "1, −1, 0, 0, −1, 0, 1, 1, 1, 0, 0, 1, 0" or "0, 1, 0, 0, 1, 1, 1, 0, −1, 0, 0, −1, 1" corresponding to a reversed code thereof. According to these spreading codes, the D/U ratio is set to a good value of 9:2 or 10:2.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A wireless transmitter for use in an ultra-wideband direct spread pulse communication system, comprising:
   a delay time controller for generating a periodic pulse, outputting the periodic pulse to a first matched filter, outputting the periodic pulse to a second matched filter when data to be transmitted is in a first level of binary logic levels, and outputting the periodic pulse to a third matched filter when the data to be transmitted is in a second level of the binary logic levels;
   the first matched filter for outputting a reference signal for determining data using a first spreading code with (2*N−1) chips when the periodic pulse is input;
   the second matched filter for outputting a first data signal earlier than the reference signal by a predetermined time using a second spreading code with (2*N−1) chips when the periodic pulse is input; and
   the third matched filter for outputting a second data signal later than the reference signal by a predetermined time using the second spreading code when the periodic pulse is input,
   wherein (2*N−2)-th and (2*N)-th values of a cross-correlation signal between the first spreading code and the second spreading code are greater than 0,
   (2*N−3)-th and (2*N+1)-th values of an auto-correlation signal of the first spreading code are less than 0,
   (2*N−3)-th and (2*N+1)-th values of an auto-correlation signal of the second spreading code are less than 0, and
   wherein N is an integer greater than 1 and less than 15, and
   wherein the first spreading code is 1, 1, 0, 0, −1, 1, 0, 1, 0, 0, 1, 0, −1 or −1, 0, 1, 0, 0, 1, 0, 1, −1, 0, 0, 1, 1 corresponding to a reversed code thereof, and the second spreading code is 1, 1, 0, 0, 0, 0, 1, −1, 1, 0, −1, 0, 1 or 1, 0, −1, 0, 1, −1, 1, 0, 0, 0, 0, 1, 1 corresponding to a reversed code thereof.

2. The wireless transmitter of claim 1, wherein the first to third matched filters are surface acoustic wave (SAW) filters.

3. A wireless receiver for use in an ultra-wideband direct spread pulse communication system, comprising:
   an antenna section for receiving an electronic wave signal and outputting the electronic wave signal to a first matched filter and a second matched filter;
   the first matched filter for receiving the electronic wave signal from the antenna section and outputting a first correlation output signal using a first spreading code with (2*N−1) chips when a reference signal for determining data is detected;
   the second matched filter for receiving the electronic wave signal from the antenna section and outputting a second correlation output signal using a second spreading code with (2*N−1) chips when a data signal is detected;
   a delay time measuring section for detecting which of the first and second correlation output signals from the first and second matched filters is first output and outputting a detection result; and
   a data determining section for receiving the detection result and determining if the data signal is in a first or second level of binary logic levels,
   wherein (2*N−2)-th and (2*N)-th values of a cross-correlation signal between the first spreading code and the second spreading code are greater than 0,
   (2*N−3)-th and (2*N+1)-th values of an auto-correlation signal of the first spreading code are less than 0, and
   (2*N−3)-th and (2*N+1)-th values of an auto-correlation signal of the second spreading code are less than 0, and
   wherein N is an integer greater than 1 and less than 15, and wherein the first spreading code is −1, 0, 1, 0, 0, 1, 0, 1, −1, 0, 0, 1, 1 or 1, 1, 0, 0, −1, 1, 0, 1, 0, 0, 1, 0, −1 corresponding to a reversed code thereof, and the second spreading code is 1, 0, −1, 0, 1, −1, 1, 0, 0, 0, 0, 1, 1 or 1, 1, 0, 0, 0, 0, 1, −1, 1, 0, −1, 0, 1 corresponding to a reversed code thereof.

4. The wireless receiver of claim 3, wherein the first to third matched filters are surface acoustic wave (SAW) filters.

5. A wireless transmitter for use in an ultra-wideband direct spread pulse communication system, comprising:
   a delay time controller for generating a periodic pulse, outputting the periodic pulse to a first matched filter, outputting the periodic pulse to a second matched filter when data to be transmitted is in a first level of binary logic levels, and outputting the periodic pulse to a third matched filter when the data to be transmitted is in a second level of the binary logic levels;
   the first matched filter for outputting a reference signal for determining data using a first spreading code with (2*N−1) chips when the periodic pulse is input;
   the second matched filter for outputting a first data signal earlier than the reference signal by a predetermined time using a second spreading code with (2*N−1) chips when the periodic pulse is input; and
   the third matched filter for outputting a second data signal later than the reference signal by a predetermined time using the second spreading code when the periodic pulse is input,
   wherein (2*N−2)-th and (2*N)-th values of a cross-correlation signal between the first spreading code and the second spreading code are greater than 0,
   (2*N−3)-th and (2*N+1)-th values of an auto-correlation signal of the first spreading code are less than 0,
   (2*N−3)-th and (2*N+1)-th values of an auto-correlation signal of the second spreading code are less than 0, and
   wherein N is an integer greater than and less than 15, and
   wherein the first spreading code is 0, 1, 0, −1, 0, 1, 1, 0, 0, 0, −1, 1, −1 or −1, 1, −1, 0, 0, 0, 1, 1, 0, −1, 0, 1, 0 corresponding to a reversed code thereof, and the second spreading code is 0, 1, 0, 0, 1, 1, 1, 0, −1, 0, 0, −1, 1 or 1, −1, 0, 0, −1, 0, 1, 1, 1, 0, 0, 1, 0 corresponding to a reversed code thereof.

6. A wireless receiver for use in an ultra-wideband direct spread pulse communication system, comprising:
   an antenna section for receiving an electronic wave signal and outputting the electronic wave signal to a first matched filter and a second matched filter;
   the first matched filter for receiving the electronic wave signal from the antenna section and outputting a first correlation output signal using a first spreading code with (2*N−1) chips when a reference signal for determining data is detected;
   the second matched filter for receiving the electronic wave signal from the antenna section and outputting a second correlation output signal using a second spreading code with (2*N−1) chips when a data signal is detected;
   a delay time measuring section for detecting which of the first and second correlation output signals from the first and second matched filters is first output and outputting a detection result; and
   a data determining section for receiving the detection result and determining if the data signal is in a first or second level of binary logic levels,
   wherein (2*N−2)-th and (2*N)-th values of a cross-correlation signal between the first spreading code and the second spreading code are greater than 0,
   (2*N−3)-th and (2*N+1)-th values of an auto-correlation signal of the first spreading code are less than 0, and
   (2*N−3)-th and (2*N+1)-th values of an auto-correlation signal of the second spreading code are less than 0, and
   wherein N is an integer greater than 1 and less than 15, and
   wherein the first spreading code is −1, 1, −1, 0, 0, 0, 1, 1, 0, −1, 0, 1, 0 or 0, 1, 0, −1, 0, 1, 1, 0, 0, 0, −1, 1, −1 corresponding to a reversed code thereof, and the second spreading code is 1, 1, 0, 0, −1, 0, 1, 1, 1, 0, 0, 1, 0 or 0, 1, 0, 0, 1, 1, 1, 0, −1, 0, 0, −1, 1 corresponding to a reversed code thereof.

7. The wireless transmitter of claim 5, wherein the first to third matched filters are surface acoustic wave (SAW) filters.

8. The wireless receiver of claim 6, wherein the first to third matched filters are surface acoustic wave (SAW) filters.

* * * * *